United States Patent
Lyubomirsky

(10) Patent No.: US 8,385,751 B2
(45) Date of Patent: Feb. 26, 2013

(54) OPTICAL TRANSMITTER ADAPTATION TO NETWORK TOPOLOGY

(75) Inventor: Ilya Lyubomirsky, Temecula, CA (US)

(73) Assignee: Infinera Corporation, Sunnyvale, CA (US)

(*) Notice: Subject to any disclaimer, the term of this patent is extended or adjusted under 35 U.S.C. 154(b) by 321 days.

(21) Appl. No.: 12/635,676

(22) Filed: Dec. 10, 2009

(65) Prior Publication Data

US 2011/0142446 A1    Jun. 16, 2011

(51) Int. Cl.
*H04B 10/06* (2006.01)

(52) U.S. Cl. .......................... 398/198; 398/183; 398/189

(58) Field of Classification Search .................. 398/147, 398/158–159, 185, 189, 182–183, 193–198
See application file for complete search history.

(56) References Cited

U.S. PATENT DOCUMENTS

| | | | |
|---|---|---|---|
| 2005/0013618 A1* | 1/2005 | Kurebayashi | 398/188 |
| 2009/0196602 A1* | 8/2009 | Saunders et al. | 398/26 |
| 2009/0304395 A1* | 12/2009 | Hong et al. | 398/189 |

* cited by examiner

*Primary Examiner* — Leslie Pascal
(74) *Attorney, Agent, or Firm* — Ross M. Carothers; David L. Soltz

(57) ABSTRACT

The present invention provides a system, apparatus and method to efficiently switch from one modulation format to another modulation format based upon a current route or path through a network topology of a network communication system. According to various embodiments of the invention, a network topology map is generated identifying one of a plurality of paths upon which a data stream is transmitted from a transmitter to a receiver within a network, the transmitter transmitting the data in a respective one of a plurality of data modulation formats. One or more characteristics related to one of the plurality of optical paths is measured and, based upon such measurement, a desired modulation format is selected. Upon a change in the network topology, the process is repeated such that the modulation format is continuously optimized with respect to the network topology.

6 Claims, 7 Drawing Sheets

OPTICAL TRANSMITTER ADAPTATION TO NETWORK TOPOLOGY

BACKGROUND OF THE INVENTION

1. Field of the Invention

This invention relates generally to optical communication systems and, more particularly, to optical communication systems which can adapt to the fiber-optic network topology to more effectively transmit data over the communication infrastructure.

2. Description of the Related Art

There is an ever increasing demand for increased capacity of network communication systems, which has led to a corresponding increase in data rates, as well as higher channel densities. Along with such higher data rates and higher channel densities come degrading effects, including signal spectral truncation due to optical filtering, linear WDM crosstalk, and nonlinear crosstalk due to inter-channel fiber nonlinear effects. Thus, there is an interest to provide more efficient modalities of transmitting data over a fiber-optic network infrastructure, as part of a network communication system. Such modalities include converting data into a proper modulation format, or data waveform format, prior to transmission. In particular, the signal pulse shape is an important design choice for optimizing transmission performance. Typical pulse shapes utilized today in the modulation process include non-return-to-zero (NRZ), and return-to-zero (RZ) with various duty cycles (e.g. pulses with 33%, 50% and 67% duty cycle can be most easily implemented using a pulse-carver Mach-Zehnder modulator (MZM)), as well as other existing formats, many of which are derived from, or further manipulation of, the NRZ or RZ formats. With reference to FIG. 5, a graph 700 depicts exemplary basic RZ and NRZ pulse shapes, each of which depicting the data bit pattern in encoded form relative to time. Moreover, in polarization multiplexed transmission, for example polarization multiplexed DQPSK (PM-DQPSK), e.g. RZ PM-DQPSK or NRZ PM-DQPSK, an addition degree of freedom exists. More specifically, the pulses of each of the two orthogonal polarization channels within a polarization multiplexed transmission can overlap in time, referred herein as "aligned" format, or can be offset by half a symbol period, referred herein to "interleaved" format. Each such format, however, has certain advantages and disadvantages relative to the network topology of the fiber-optic communication network. For example, interleaved formats typically have the best tolerance to nonlinear polarization scattering impairments; however, interleaved formats suffer greater penalty for polarization mode dispersion compared with aligned formats. RZ formats typically have a better tolerance to nonlinear transmission effects compared with NRZ formats but may suffer more spectral truncation by optical filters due to a wider spectrum of RZ signals. Therefore, network communication systems which rely on a single modulation format are less flexible to adapt to changing or variable network topologies, resulting in increased costs or inefficient operation of the communication system.

What is needed is an optical transmitter that can dynamically switch from one modulation format to another modulation format in response to real-time changes in the network topology of a network communication system, such that the optical transmitter continuously optimizes itself to the changes in the network topology. Further, what is needed is a transmitter which can provide such switching based upon certain characteristics of the network topology, some of which may change due to intentional switching of network optical paths, or with changing environmental conditions such as temperature. Still, what is needed is an optical transmitter which provides such switching in the electrical domain, prior to optical modulation. Still further, what is needed is a transmitter which can modify the data waveform prior to optical modulation to further reduce undesirable effects due to changes in the network topology.

SUMMARY OF THE INVENTION

The present invention provides a system, apparatus and method to efficiently switch from one modulation format to another modulation format based upon a route or path of a network topology of a network communication system upon which data is transmitted. According to various embodiments of the invention, a network topology map is generated identifying one of a plurality of optical paths upon which a data stream is transmitted from a transmitter to a receiver within a network, the transmitter transmitting the data in a respective one of a plurality of data modulation formats. A characteristic related to one of the plurality of optical paths is measured and, based upon such measurement, a desired modulation format is selected. Upon a change in the network topology, the process is repeated such that the modulation format is continuously optimized with respect to the changing network topology.

In various embodiments of the invention, the characteristics related to the plurality of optical paths may be selected from a group consisting of a number and type of optical filters along the optical path, the number of optical add-drop multiplexers along the optical path, a number of spans along the optical path, fiber type of each span, WDM channel spacing, the launch power into each of the spans, and/or polarization mode dispersion of the optical path. In certain other embodiments, the characteristic is measured with respect to a single optical channel traveling over the optical path, while in still other embodiments, the characteristic is measured with respect to each of the optical channels traveling over the optical path. In still other embodiments, the characteristic is one of a plurality of characteristics measured relative to an optical path. Furthermore, in other embodiments, the characteristic is derived from a mathematical formula with variables obtained from a plurality of characteristics measured relative to an optical path. Also, in various other embodiments, the pulses in the two polarization channels of a polarization-multiplexed signal are either aligned or interleaved in time such that the transmission is further optimized for the optical path.

In still other embodiments the communication of certain characteristics from a receiver to a transmitter within the network is facilitated by a network management system (NMS). The NMS can utilize the data optical path for transmission of such characteristics, such as via overhead bytes in the frame, or can utilize other network connections through which to pass the characteristics.

In yet other embodiments a communication apparatus is provided which includes a control circuit configured to monitor a characteristic of an optical path and supply a first control signal based on the characteristic to a driver circuit. In response to the control signal, the driver circuit selects one of a plurality of drive signal formats for data transmission. The drive signal is provided to an optical modulator such that the optical modulator supplies first optical pulses having a first one of a plurality of pulse shapes. In response to a change in the characteristic, the control circuit supplies a second control signal to the driver circuit. In response to the second control signal, the driver circuit selects a second one of the plurality of drive signal formats in response to the second control signal, and the driver circuit supplies a second drive signal to the optical modulator which supplies second optical pulses having a second one of the plurality of pulse shapes.

Other objects, features and advantages of the invention will be apparent from the drawings, and from the detailed description that follows below.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. In the drawings wherein like reference symbols refer to like parts.

DETAILED DESCRIPTION OF THE INVENTION

The present invention provides a system, apparatus and method to efficiently switch from one modulation format to another modulation format based upon the network topology of a fiber-optic communication network. According to various embodiments of the invention, a network topology map is generated identifying one of a plurality of optical paths upon which a data stream is transmitted from a transmitter to a receiver within a network, the transmitter transmitting the data in a respective one of a plurality of modulation formats, such as NRZ, RZ or other types of waveforms, time aligned or interleaved polarizations, etc. A characteristic related to one of the plurality of optical paths is measured and, based upon such measurement, a desired modulation format is selected. Upon a change in the network topology, the process is repeated such that the modulation format is continuously optimized with respect to the network topology.

The following description is set forth for purpose of explanation in order to provide an understanding of the invention. However, it is apparent that one skilled in the art will recognize that embodiments of the present invention, some of which are described below, may be incorporated into a number of different systems and devices.

The embodiments of the present invention may be present in hardware, software or firmware. Structures and devices shown below in block diagram are illustrative of exemplary embodiments of the invention and are meant to avoid obscuring the invention. Furthermore, connections between components within the figures are not intended to be limited to direct connections. Rather, data between these components may be modified, re-formatted or otherwise changed by intermediary components.

Figure 1A:
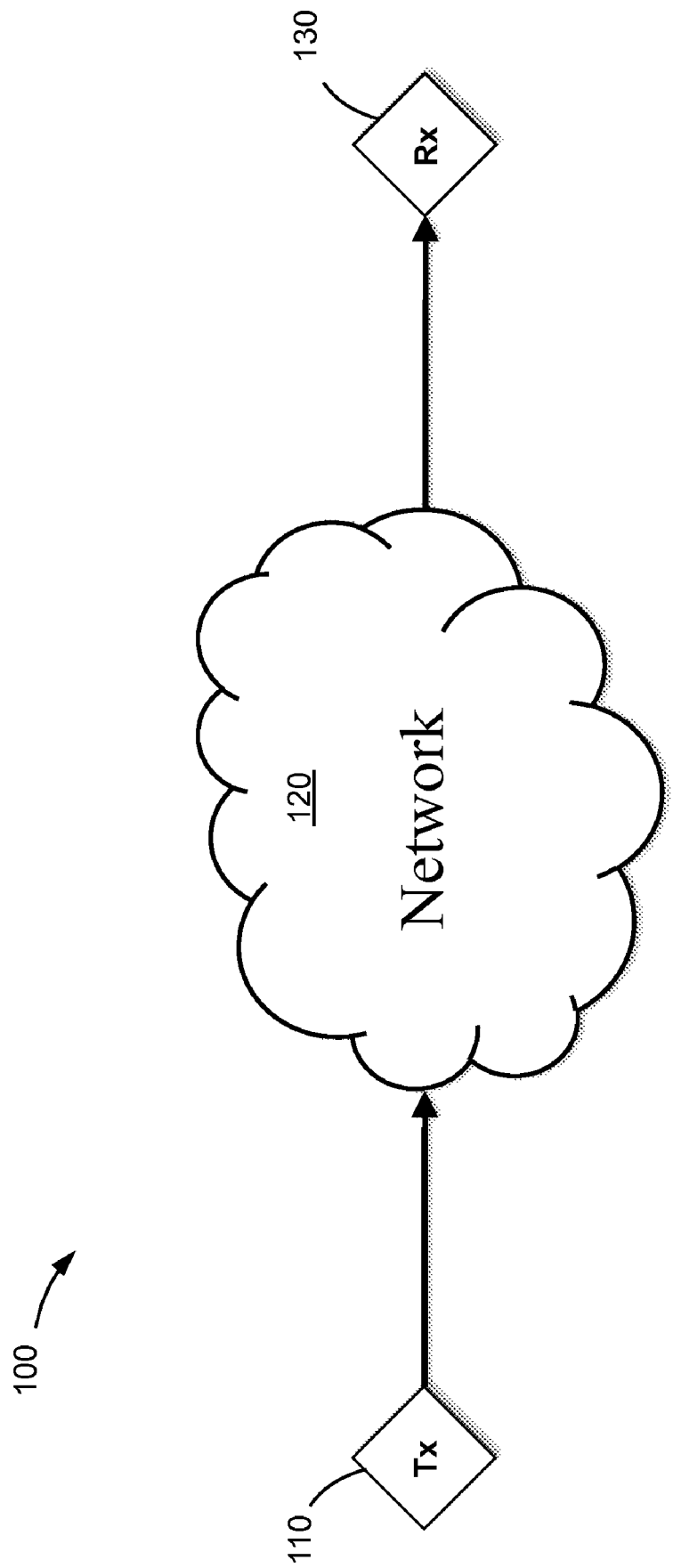
FIG. 1A is a general block diagram of a network topology, according to certain aspects of the invention.

Now turning to FIG. 1, a general network communication system 100 is depicted. While the following discussion describes data flow in one direction, e.g. from a transmitter to a receiver, it should be readily understood that the following discussion also pertains to bi-directional traffic, e.g. from a first transceiver to a second transceiver.

Network communication system 100 includes a transmitter 110 and a receiver 130 and a network infrastructure 120 therebetween. The transmitter 110 accepts a data stream, e.g. a train of binary data, and modulates the data for transmission over the network infrastructure 120. Modulation of the data stream can be achieved in the electrical domain or the optical domain. For example, if modulation of the data stream occurs in the electrical domain, the resulting modulated signal can be applied to a laser source, as part of a photonic integrated circuit for example, directly modulating the laser to achieved the desired modulated output for transmission over the network infrastructure. Alternatively, an electrical signal corresponding to the data stream can be applied to a modulator, such as a electro-absorption modulator or a Mach-Zehnder modulator, which then properly modulates a received optical signal from a laser source. In any case, the modulated optical signal transmitted over the network infrastructure 120 is then received by the receiver 130 and decoded to extract the data stream.

Figure 1B:
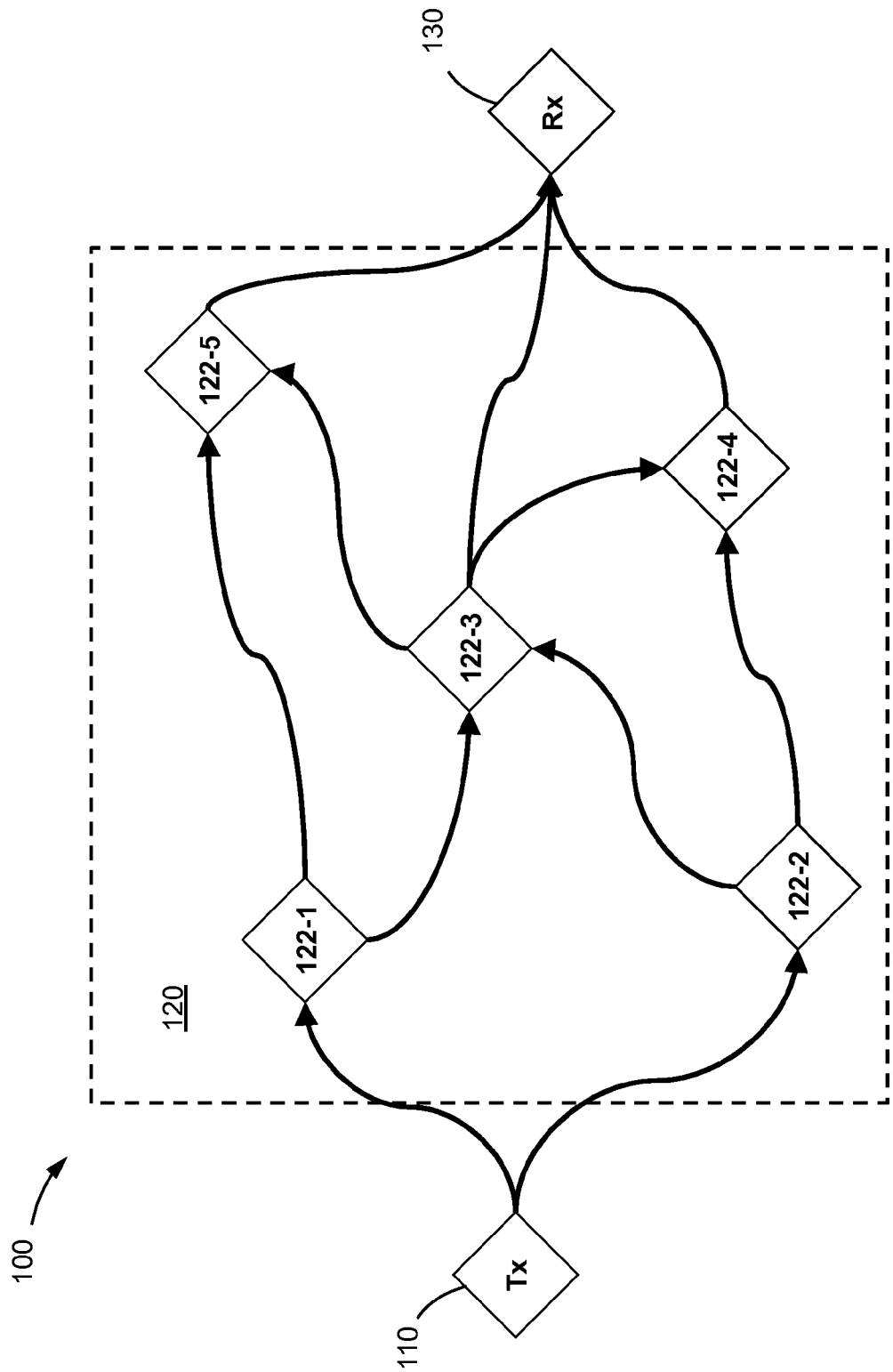
FIG. 1B is a more detailed block diagram of the network topology of FIG. 1A, according to certain aspects of the invention, depicting various intermediate nodes of the network infrastructure.

Turning to FIG. 1B, the network infrastructure 120 of the network communication system 100 includes a plurality of intermediate nodes 122, for example nodes 122-1 through 122-5. While only five intermediate nodes 122 are depicted for simplicity purposes, one of ordinary skill in the art would appreciate that the network infrastructure 120 of the present invention can include any number of nodes, 122-n. Each of the nodes 122 are interconnected with certain adjacent nodes 122 via spans, as represented by the interconnecting arrows of FIG. 1B. Such a network topology, or network topology map, as depicted in FIG. 1B allows for the transmission of data from the transmitter 110 to the receiver 130 over one of a plurality of different paths defined by the interconnecting spans.

In the exemplary arrangement of FIG. 1B, the transmitter 110 interfaces with a node 122-1 and a node 122-2. Node 122-1 then interfaces with a node 122-5 and a node 122-3, while node 122-2 interfaces with the node 122-3 and a node 122-4. Node 122-3 interfaces with the node 122-4, and the node 122-5, the node 122-3, and the node 122-4 each interface with the receiver 130. While the transmitter 110 and receiver 130 are depicted as being external to the network infrastructure 120, for the purposes of the disclosure herein, the transmitter 110 and receiver 130 may be considered part of the network infrastructure 120, as well.

The various nodes 122 of the network infrastructure 120 and the interconnecting spans define a number of different paths or routes over which a data stream can travel from the transmitter 110 to the receiver 130. Each such route has certain related characteristics, hereinafter also referred to as route characteristics, which impact the optical signals which propagate through the network infrastructure. The route characteristics include, but are not limited to, transmission fiber type, fiber dispersion, polarization mode dispersion ("PMD"), fiber nonlinear coefficient, number and type of optical filters concatenated along the path, characteristics of the optical amplifiers, signal launch power, the wavelength division multiplexed ("WDM") signal channel spacing, and the type of traffic present on the same fiber (e.g. mixed or pure systems). The route characteristics may be acquired or obtained with respect to one or more optical channels which propagate over the optical path of concern. Based upon such route characteristics, one of a plurality of data modulation formats can be selected at the transmitter 110 to optimize propagation of the optical energy through the network infrastructure 120. Each of the plurality of data modulation formats have advantages and disadvantages which make them optimum for a specific network topology. Thus, the transmitter can include a switchable modulation output which is dependent on the network topology or configuration, also referred herein as a network topology map, as well as other certain operating conditions such as temperature and length of time in service, providing continuous optimization of the transmitted data as the network topology changes.

One category of such route characteristics is related to elements which result in spectral truncation, a deleterious effect whereby the effective optical bandwidth available to a WDM channel is reduced by concatenation through multiple optical band-pass filters. For example, an increasing number of optical filters, including other filtering devices such as optical add-drop multiplexers, as part of one or more intermediate nodes 122, along a route from the transmitter 110 to the receiver 130 can lead to spectral truncation and, ultimately, distortion in the propagating optical signal. Since the NRZ modulation format has a narrower spectrum and, thus, is more resilient to spectral truncation by optical filters, it may be desirable to select the NRZ modulation format for network topologies including paths having a large number of optical filters.

Another category of such route characteristics is related to elements which promote non-linear effects, including self-phase modulation (SPM), cross-phase modulation (XPM), and four-wave mixing (FWM). This includes the type of transmission fiber, e.g. conventional single mode fiber (SMF) versus non-zero dispersion shifter fiber (NZDSF), number of spans between intermediate nodes 122 along a path from the transmitter 110 to the receiver 130, as well as the distance of each span, and span launch power. Since the RZ modulation format can more effectively tolerate some non-linear effects, tolerating higher launch power for example, the RZ modulation format is better suited for network topologies including long paths on NZDSF fiber or related fiber with smaller effective area and small dispersion compared with SMF fiber. Similarly, for polarization multiplexed signals, the time interleaved formats are more resilient to XPM and XPM-induced nonlinear polarization scattering compared with time aligned formats; on the other hand, aligned formats have better tolerance for fiber PMD.

When both fiber nonlinearity as well as spectral truncation due to optical filtering impairs the transmission, then a specific flavor of RZ modulation with a narrower spectrum, such as 67% duty cycle RZ (also known as "carrier suppressed" RZ (CSRZ) in OOK transmission), may be selected by the transmitter to obtain the optimum balance in mitigating both linear filtering and nonlinear fiber impairments.

Additionally, non-linear effects are related to the fiber type utilized to form each span along a path, as well. One such characteristic of the fiber type and its quality of construction is the corresponding PMD observed along a given path. Due to the level of imperfections and asymmetries of the fiber, a varying level of PMD along a given path may be observed. If low PMD is observed, it may be preferable to use a bit-interleaved format due to its good non-linear tolerance, providing for longer span distances. Alternatively, if high PMD is observed it may be preferable to use a bit-aligned format, however, for transmission over shorter span distances, e.g. shorter reach. Moreover, PMD can change over time or due to temperature fluctuations. Such changes to PMD along a given path are considered changes to the network topology in the context of this disclosure and, thus, may require further modulation format optimization.

Still other modulation formats may yield lower bit error rates or improved performance for transmission in networks having other topologies. For example, CSRZ (or effectively a wider duty cycle RZ compared to standard 50% duty cycle RZ) is useful where some filtering along a given path through the network infrastructure is present, however an RZ pulse shape is desired for improved nonlinear tolerance. Alternatively, a chirped RZ (CRZ) format may be useful to suppress fiber nonlinearity in some systems, at the expense of significantly wider spectrum. One may also envision a hybrid system, where alternate WDM channels have different modulation formats to gain an advantage over linear or nonlinear impairments. Such a hybrid system is within the scope of the present invention.

Once the characteristics of a route over which an optical signal propagates through a network infrastructure are know, a desired modulation format can be selected which is optimized for that route. When the network topology changes such that the route taken by the propagating optical signal changes, the desired modulation format may change, as well.

Figure 1C:
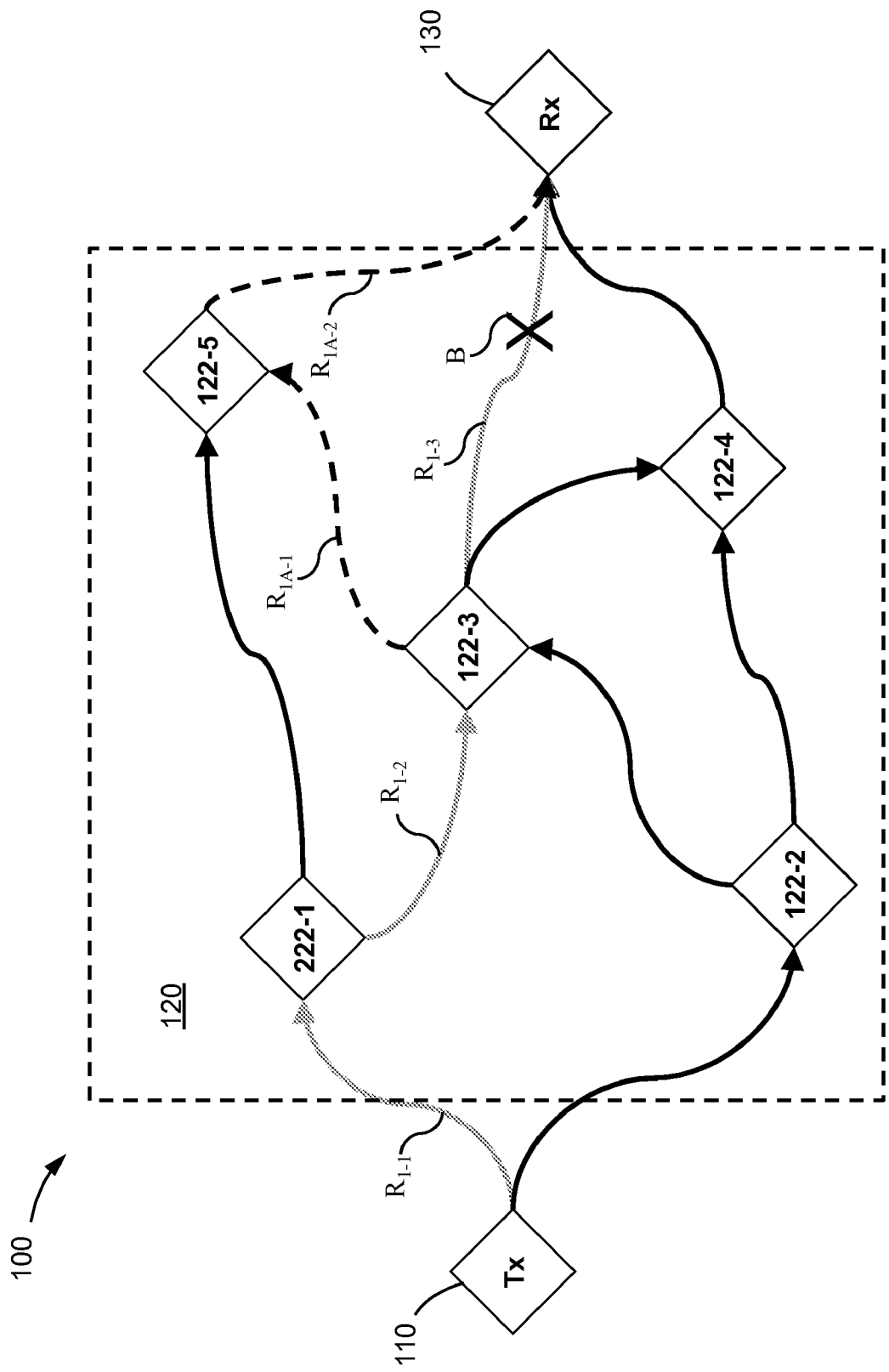
FIG. 1C depicts the block diagram of FIG. 1B, detailing various exemplary optical paths through the network infrastructure, according to certain aspects of the invention.

Now turning to FIG. 1C, propagation of a data stream over the network infrastructure 120 will be discussed in greater detail. The data stream is intended to be transmitted from the transmitter 110 to the receiver 130, over the network infrastructure via an exemplary route $R_1$. More specifically, the data stream is transmitted from the transmitter 110 to a first node 122-1 along route $R_{1-1}$, then to a second node 122-3 of route $R_{1-2}$, and finally to receiver 130 along route $R_{1-3}$. Based upon the specific characteristics of the network topology 120, and the route $R_1$ specifically, a desired modulation format is selected for the transmission. Upon a break in the span between node 122-3 and the receiver, identified as point "B" along route $R_{1-3}$, a new network topology, as well as a corresponding new route, is defined. As shown, a new sub-route $R_{1A}$ is defined to compensate for the loss of that portion of route $R_1$ spanning between node 122-3 and the receiver 130, e.g. route $R_{1-3}$. Route $R_{1A}$ provides an alternate path from the node 122-3 to the receiver 130 via intermediate node 122-5, as shown in dashed line in FIG. 1C. Once the newly defined route, incorporating route $R_{1A}$, is established, the characteristics of the route, now including route $R_{1-1}$, route $R_{1-2}$, route $R_{1A-1}$, and route $R_{1A-2}$, can be obtained and a corresponding modulation format defined.

Figure 2:
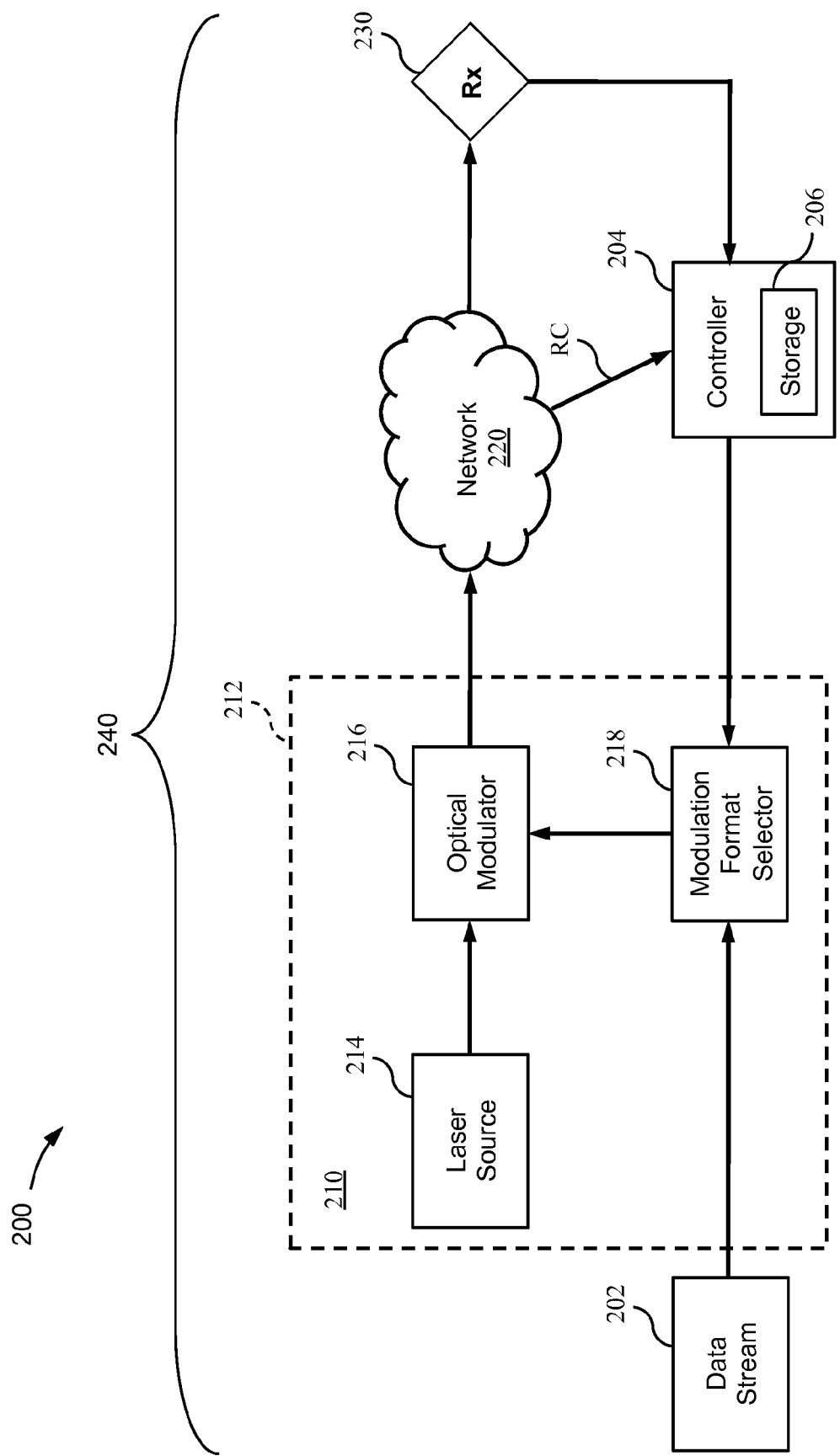
FIG. 2 depicts a first exemplary system, according to certain aspects of the invention.

An exemplary system 200 for optimizing the modulation format of an optical signal propagating a network infrastructure 220 from a transmitter 210 to a receiver 230 is depicted in FIG. 2. The network infrastructure 220, similar to the network infrastructure 120, comprises a plurality of network nodes 222 (not shown). The transmitter 210 includes a laser source 214, an optical modulator 216 and a modulation format selector 218, all of which may be provided on the same substrate 212. Alternatively, each of the elements 214, 216, 218 of the transmitter 210 may be provided as separate devices interconnected to form the functionality of the transmitter 210.

In operation, a data stream 202 is provided to the modulation format selector 218 of the transmitter 210. The modulation format selector 218, based upon the characteristics of the current route through the network infrastructure 220 from the transmitter 210 to the receiver 230, selects a suitable modulation format and provides an electrically modulated output signal to the optical modulator 216. Modulator 216 optically modulates an optical signal received from the laser source 214 according to the electrically modulated output received from the modulation format selector 218. The laser source 214 can be any suitable source, for example a continuous wave distributed feedback laser source, and the optical modulator 216 can be any suitable modulator, such as an electro-absorption modulator or a Mach-Zehnder modulator. The optical modulator 216 provides a modulated optical signal output to the network infrastructure 220, corresponding to the data stream 202 initially received by the transmitter 210 and ultimately transmitted to the receiver 130. As should be readily understood by one of ordinary skill in the art, while depicted as provided to the optical modulator 216, the electrically modulated output signal from the modulator format selector 218 can be used to directly modulate a suitable laser source.

Information representative of one or more characteristics related to the route over which the modulated optical signal output travels through the network infrastructure 220, e.g. route characteristics, is acquired by a controller 204 from the associated nodes 122 along the route, indicated by arrow RC of FIG. 2, and as part of the network infrastructure 220, as well as the receiver 230. As described in more detail above, the controller 204 instructs the modulation format selector 218 to select one of a plurality of modulation formats based upon the received route characteristics related to the current route. The controller 204 is preferably configured to continuously receive such information and, therefore, can continuously adapt to the changing conditions of the network topology.

The controller 204 may be located at any suitable location, for example within the transmitter 210, receiver 230, or any of the plurality of nodes 122 of the network infrastructure 220. Additionally, the controller 204 may be one of a plurality of controllers 204-$n$, each of which may be located within the transmitter 210, receiver 130, or any of the nodes 122 of the network infrastructure 220. The controller 204 may receive the route characteristics through any suitable means. For example, the route characteristic information may be communicated through the network infrastructure 220, e.g. as part of the data transmitted via an optical signal, traveling through the network infrastructure 220, or may be communicated directly to the controller 204 over additional optical or copper interconnections. Additionally, while the route characteristics are preferably automatically provided to the controller 204, e.g. without human interference, the route characteristics can be manually entered into the controller 204 by an operator, especially those route characteristics which are static in nature such as the various span lengths between the plurality of nodes of the network infrastructure. Data acquisition of all or certain characteristics from any receiver to any transmitter within the network infrastructure may be facilitated by a network management system 240, as symbolized in FIG. 2. As such, the network management system 240 can utilize the data optical path for transmission of such characteristics, such as via overhead bytes in the frame, or can utilize other network connections through which to pass the route characteristics. The network management system 240 may include the one or more controllers 204 associated with the network infrastructure 220.

Although the route characteristics may be obtained continuously resulting in continuous calculation of a corresponding suitable modulation format, the controller 204 may include a storage device 206 for storing the route characteristics local to the controller 204. In addition to storage and instant access to various static values associated with the route characteristics, trends can be observed relative to dynamic values such as the changes in PMD observed over time relative to a specific route, or a particular span or spans of the specific route. The storage device 206 can be any suitable storage device including, but not limited to, dynamic memory devices, programmable memory devices such as electrical erasable programmable memories, or disk storage devices. Preferably, the storage device 206 incorporates a non-volatile memory so that the data is preserved during power failures.

Figure 3:
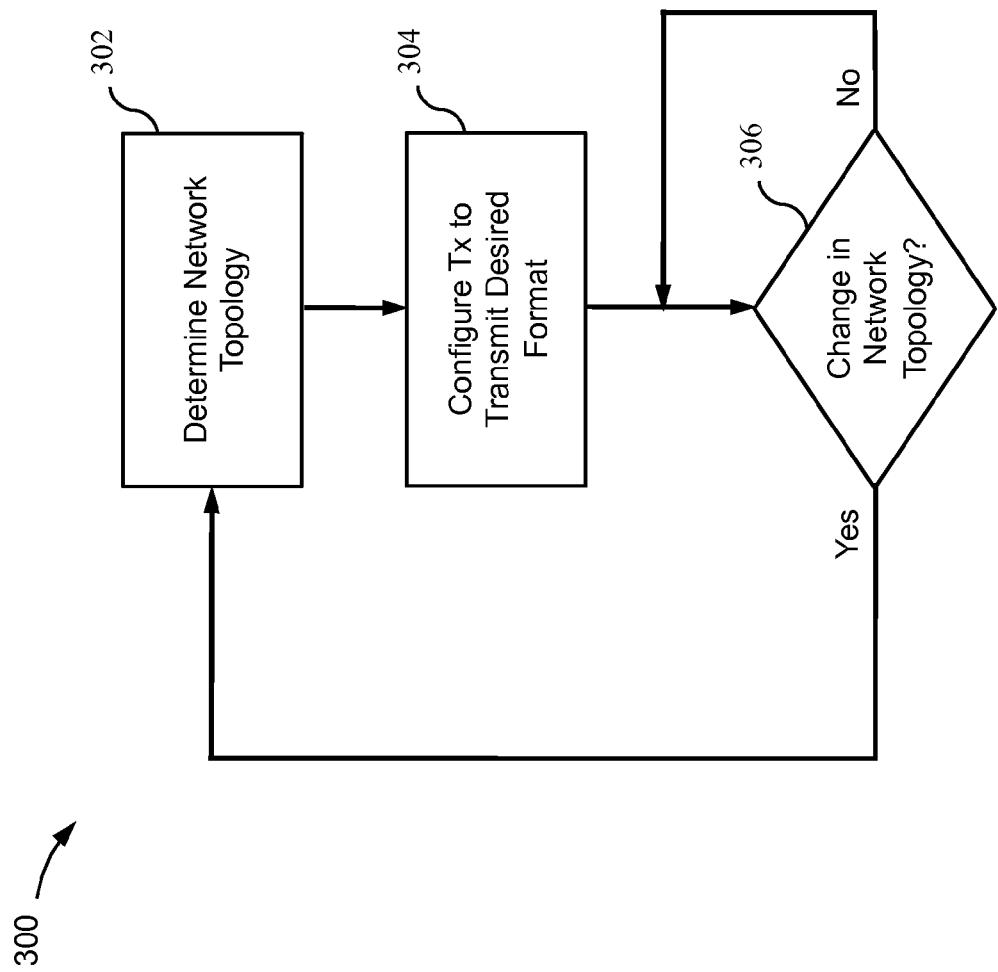
FIG. 3 is a general flowchart showing the method of selecting a preferred modulation format based upon the network topology, according to certain aspects of the present invention.

FIG. 3 is a flowchart illustrating a method, independent of structure, for selecting a modulation format for transmitting a data stream from a transmitter to a receiver across a network infrastructure, according to various embodiments of the invention. A network topology is determined 302 through discovery of a plurality of nodes of a network infrastructure, the plurality of nodes 120 of network infrastructure 220 for example. This network topology includes route characteristics related to a current route of the data through the network infrastructure 220. Based upon the route characteristics, the transmitter 210 is configured to transmit the data stream in a corresponding modulation format 304.

The network topology is analyzed 306 to determined whether a change in the topology has occurred. If a change in the network topology has occurred then the network topology is determined 302 once again. If a change in the network topology has not occurred then the transmission of the data stream using the currently selected modulation format persists. As mentioned above, certain changes over time or due to variations in temperature, such as levels of PMD along the current route, may result in a corresponding change in the network topology, upon which the network topology is determined in step 302 once again. Therefore, based upon the level of PMD associated with the route, for example an average value of PMD over a period of time, the transmitter 310 may be configured to use a different modulation format, optimized for the route. Thus, as used herein, a change in the network topology may include, in addition to structural changes to the network 220, non-structural changes to the network or portions thereof, such as a change in PMD in a particular optical path or span over a period of time. Another non-structural change is aging of the optical components, such aging resulting in higher span losses in optical fiber, or lower power output realized in optical amplifiers.

Figure 4:
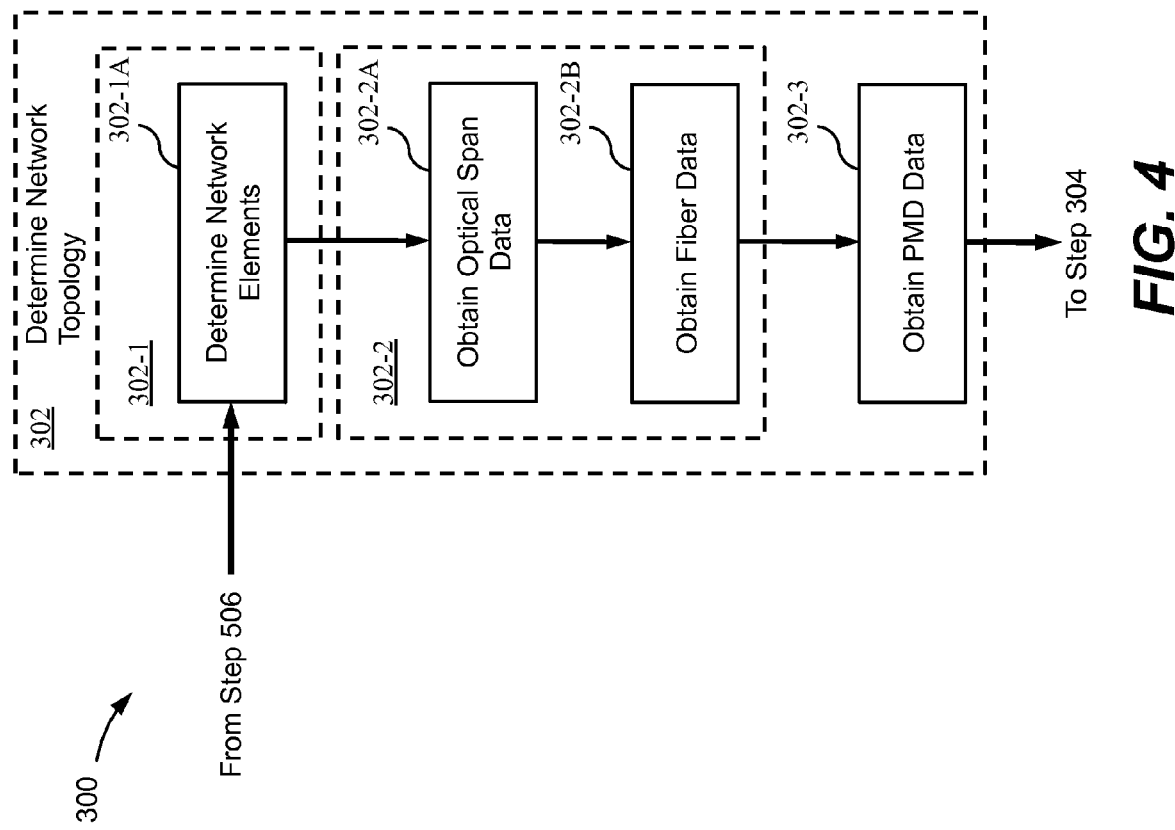
FIG. 4 is a more specific flowchart of a portion of the method of FIG. 3, according to certain aspects of the present invention.
Figure 5:
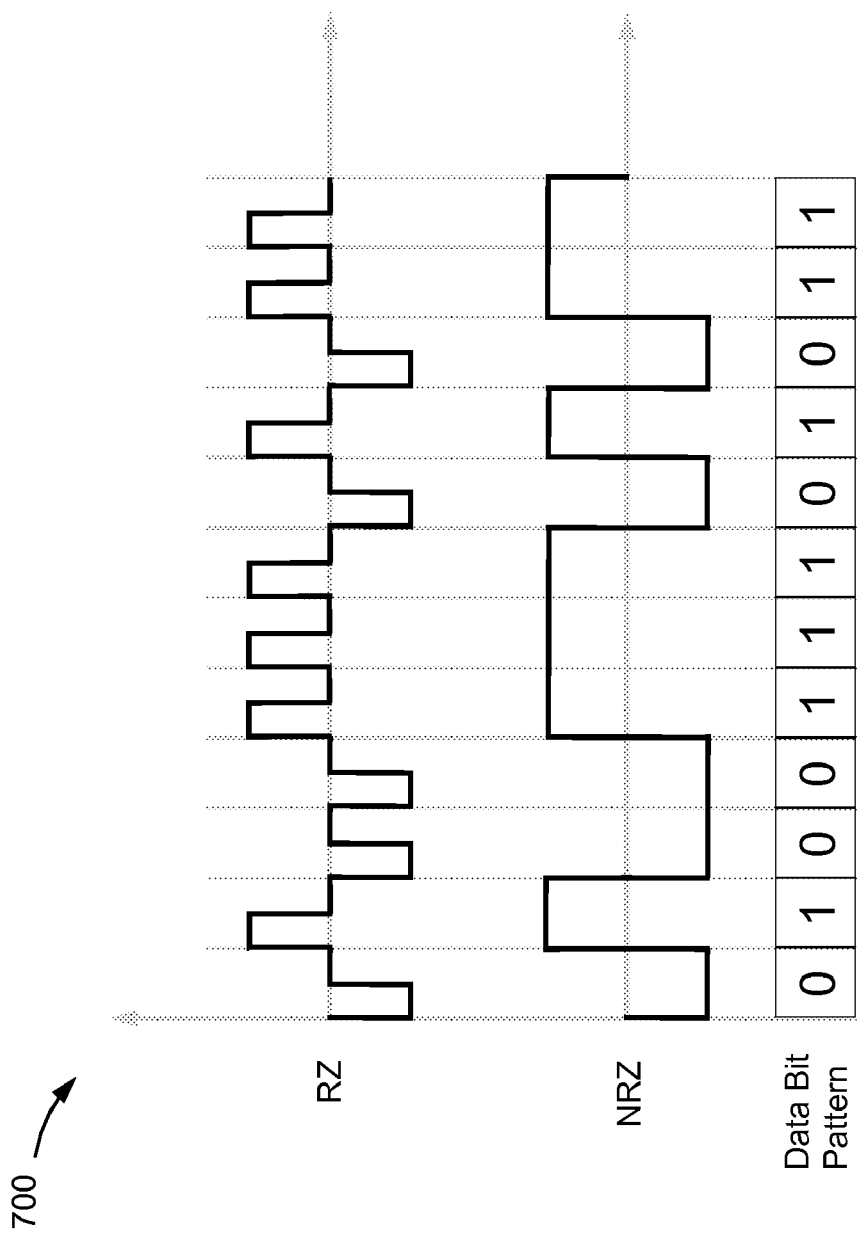
FIG. 5 depicts exemplary RZ and NRZ waveforms, according to certain aspects of the present invention.

FIG. 4 is a flowchart illustrating a portion of the method of FIG. 3 in greater detail, according to various embodiments of the invention. The network topology, including route characteristics, is determined in the step 302. For example, characteristics which lead to spectral truncation are determined, or otherwise obtained, in a step 302-1. For example, in a step 302-1A certain network 220 elements which are deployed along a route, e.g. route $R_1$ or $R_{1A}$, are determined. Such network 220 elements may include the number of optical filters, or elements which have similar effects on an optical signal propagating through the network infrastructure on the current route such as optical add-drop multiplexers. Route characteristics which lead to non-linear effects are determined, or otherwise obtained, in a step 302-2. For example, data related to the spans, e.g. spans $R_{1-1}$, $R_{1-2}$, and $R_{1-3}$ of route $R_1$ of FIG. 1C, along the route are determine in a step 302-2A, such as the number of spans and the length of each span along the route. Also, fiber data corresponding to the fiber along the route is obtained in a step 302-2B.

PMD data is obtained in a step 302-3 and, along with the other data determined, or otherwise obtained, in the step 302 is then provided for analysis, such as to controller 204 of system 200. The PMD data may be obtained through any suitable means. For example, obtaining PMD data includes obtaining an initial PMD data of the associated transmission fiber at the time the fiber span was constructed. In this way, the PMD data value will remain constant during the acquisition step 302-3. Alternatively, PMD data can be measured over a period of time, an averaged value over the time period stored in a database for future comparison. Thereafter, in step 302-3 an averaged value of PMD data over a time period can be obtained from the database of previously measured PMD data for the transmission fiber. The PMD data can be relative to a single optical channel propagating along the transmission fiber, or can be relative to a plurality of optical channels propagating along the transmission fiber, being received by a single receiver for example. Based upon such PMD data acquisition a more optimal modulation format can be determined for the current route passing through the network infrastructure and provided to configure the transmitter for transmission in the desired more optimum modulation format, e.g. in the step 304.

While some of the information related to the network topology may be determined or obtained through manual data entry, by an operator for example, preferably the information is automatically obtained through an auto-discovery process for example. Such an auto-discovery process can be initiated by one or more controllers, such as the controller 204 of system 200. For example, the controller 204 can poll the various nodes 222 of network 220 for information. Alternatively, each node 222 can include circuitry which automatically sends the information relative to that node to the controller 204. Further, while the information related to the network topology may be obtained via the network 220 infrastructure, for example utilizing the various optical paths and channels afforded the optical network 220, preferably the information is obtained through the use of additional optical communication paths or electrical communication paths, e.g. over copper wiring, to avoid undesirable disruption of the data streams passing through the network infrastructure.

While the invention has been described in conjunction with several specific embodiments, it is evident to those skilled in the art that many further alternatives, modifications and variations will be apparent in light of the foregoing description. For example, rather than providing the modulation formats in the electrical domain, the data stream can be switched to one of a plurality of optical modulators or optical modulator systems along an optical path originating from a laser source, each of the plurality of modulators or modulator systems providing one of a plurality of modulation formats. When not in use, the remaining modulators along the optical path would be biased to allow the optical energy to freely propagate. Therefore, the desired optical modulation format can be achieved in the optical domain. Thus, the invention described herein is intended to embrace all such alternatives, modifications, applications and variations as may fall within the spirit and scope of the appended claims.

What is claimed is:

1. A communication apparatus, comprising:
a control circuit including a memory, the control circuit being configured to monitor a characteristic of an optical path and store a plurality of values of the characteristic in the memory, the control circuit supplying a first control signal indicative of an average of the plurality of values of the characteristic;
a driver circuit configured to receive the first control signal and select a first one of a plurality of drive signal formats in response to the first control signal; and
an optical modulator, the driver circuit supplying a first drive signal to the optical modulator in accordance with the selected first one of the plurality of drive signals formats, such that the optical modulator supplies first optical pulses having a first one of a plurality of pulse shapes, wherein, in response to a change in the characteristic, the control circuit supplies a second control signal to the driver circuit, the driver circuit selects a second one of the plurality of drive signal formats in response to the second control signal, and the driver circuit supplies a second drive signal to the optical modulator in accordance with the selected second one of the plurality of drive signal formats, such that the optical modulator supplies second optical pulses having a second one of the plurality of pulse shapes.

2. A communication apparatus in accordance with claim 1, wherein the first one of the plurality of pulse shapes is a return-to-zero (RZ) pulse shape.

3. A communication apparatus in accordance with claim 2, wherein the second one of the plurality of pulse shapes is a non-return-to-zero (NRZ) pulse shape.

4. A communication method, comprising:
providing a plurality of values of a characteristic of an optical path;
selecting a first one of a plurality of optical signal pulse shapes based on an average of the plurality of values of the characteristic;
supplying a series of first optical pulses to the optical path, the first optical pulses having the selected first one of the plurality of optical signal pulse shapes;
determining that a change in the characteristic has occurred;
selecting a second one of the plurality of optical signal pulse shapes based on the changed characteristic; and
supplying a series of second optical pulses to the optical path, the second optical pulses having the selected second one of the plurality of optical signal pulse shapes.

5. A communication method in accordance with claim 4, wherein the first one of the plurality of pulse shapes is a return-to-zero (RZ) pulse shape.

6. A communication method in accordance with claim 4, wherein the second one of the plurality of pulse shapes is a non-return-to-zero (NRZ) pulse shape.

* * * * *